Dec. 8, 1959 A. H. HAROLDSON ET AL 2,915,786
METHOD FOR MAKING COHERENT UNSINTERED PLASTIC TAPE
Filed July 26, 1957 2 Sheets-Sheet 1

INVENTORS
Arthur H. Haroldson
Edward A. Mulrooney, Jr.
William P. Hogan
BY
Wm. R. Glisson
ATTORNEY

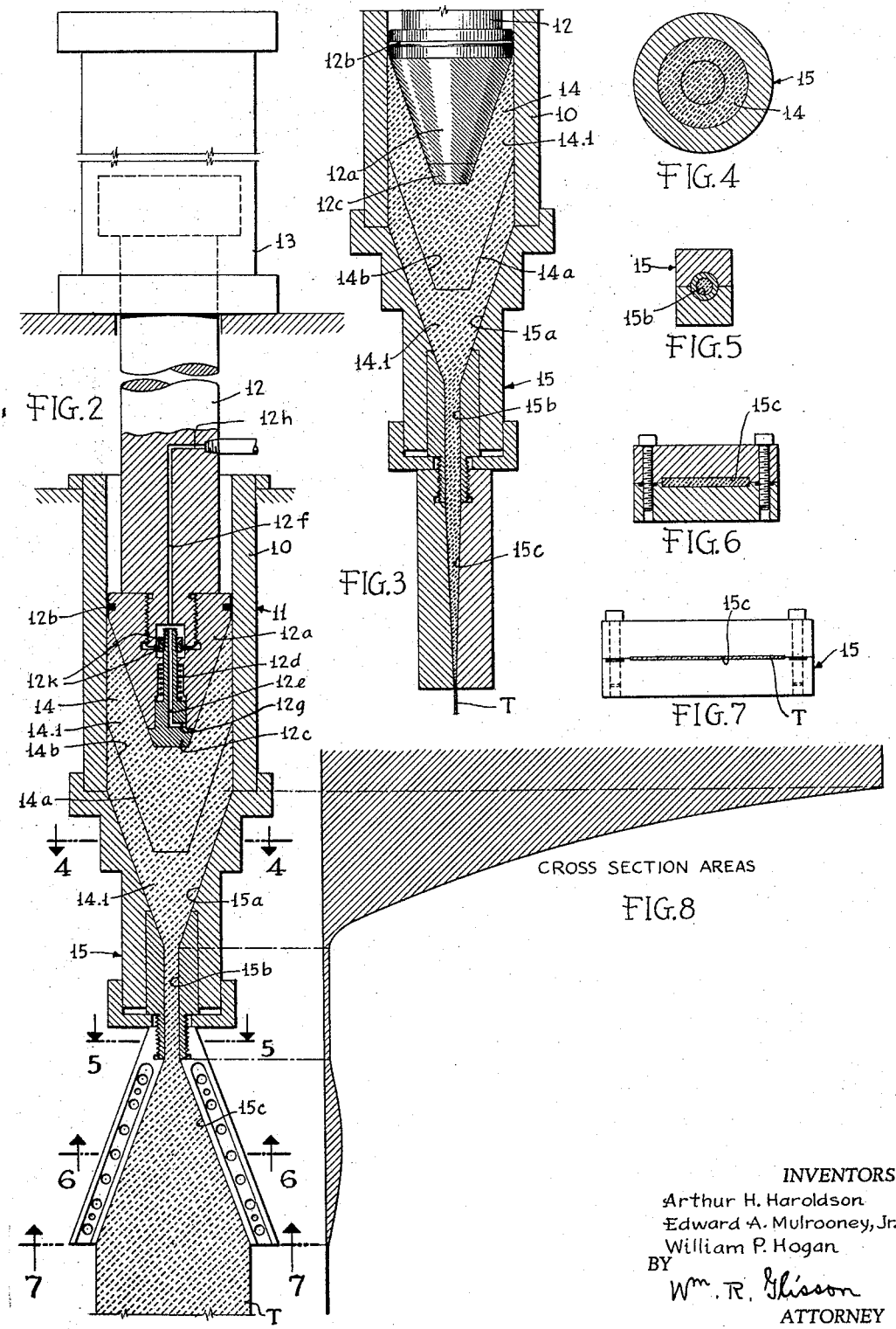

United States Patent Office 2,915,786
Patented Dec. 8, 1959

2,915,786

METHOD FOR MAKING COHERENT UNSINTERED PLASTIC TAPE

Arthur H. Haroldson, Newark, Edward A. Mulrooney, Jr., New Castle, and William Paul Hogan, Newark, Del., assignors to Continental-Diamond Fibre Corp., Newark, Del., a corporation of Delaware Application July 26, 1957, Serial No. 674,463

5 Claims. (Cl. 18—55)

This invention relates to method for making coherent unsintered tape, sheet, ribbon or strip of plastic material, such as polytetrafluoroethylene (known commercially as "Teflon," "fluon" or "the noble plastic") which cannot be extruded in the liquid state, and has for an object the provision of improvements in this art.

It is a known practice to form rods from this plastic material by compressing the powder in increments through a long die tube and sintering the compressed material into a coherent rod or bar. It is the heat-sintering action which makes the rod coherent transversely.

Also it is a known practice to mix the powder of this plastic material with a plasticizer, lubricant or extrusion aid, as it is variously called, and then to extrude it into rod, tube, or sheet form; eliminate the lubricant, and sinter the emerging strip. Again it is the sintering action which gives the resultant strip material the desired transverse strength. If the strip is not sintered it has no substantial side or transverse strength and will split longitudinally under the slightest force.

There are many uses where it is highly desirable to have a tape of this plastic material in the unsintered condition. Among these uses may be mentioned conductor sheath wrappings, tube wrappings, laminations, and the like. In order for the sheet or ribbon material to have proper usefulness it must have good transverse strength as well as the normally inherent longitudinal or machine-direction strength resulting from extrusion by any of the known processes. The transverse strength is absolutely essential to prevent splitting or tearing which would make the material completely unsuitable for the highly exacting uses expected of it.

Heretofore, so far as known, it has been impossible to produce extruded unsintered strip or sheet forms of this plastic material which had the necessary side strength to permit it to be used for the stated purposes without splitting.

We have found that by special treatment and apparatus during extrusion and subsequently it is possible to form strip material which does have the necessary transverse strength to be tenaceously coherent throughout later operations and when used for wraps, laminations and the like.

We observed that when this plastic material with a lubricant was extruded through a usual die with a simple reduction in size, it seemed to form into long parallel fibers, which fibers, due to the nature of the material, had no ability to interlock laterally with each other to give side strength.

Proceeding from this observation, we took a batch of the extruded product and kneaded it together thoroughly, then reformed it into a billet or pre-form, as before, and again extruded it into strip form. The re-extruded form was found to have considerable side strength.

However, the kneading and re-extrusion method is slow and expensive so we then devised apparatus and method by which a strip could be made continuously by extrusion which would have the desired transverse or side strength. This apparatus includes an extrusion press and die providing extremely high extrusion pressure and a transverse mixing action during extrusion whereby the long fibers which are formed are thoroughly mixed and intertwined to give the desired transverse strength. The sheet or strip strand or ribbon as it issues from the extrusion die has sufficient side strength to permit it to be stretched extensively in a transverse direction without splitting or unduly thinning locally. By subsequently calendering this strip material to greatly elongate it, say by eight or ten to one, and also to widen it, by about two or more to one, and then eliminating the lubricant, the side strength is greatly improved and a final product is produced which uniformly across its width is very tenacious transversely as well as being strong longitudinally so that it can be applied with full assurance of providing a sound layer of protective dielectric material.

The calendering method and apparatus are unique in themselves and provide considerable side stretching and rolling to move the fibers laterally to mingle and intertwine and accentuate the side strength. This forms the subject matter of another application insofar as the calendering step alone is concerned but herein is disclosed as a component part of an overall method for producing an unsintered plastic tape having great transverse strength and good density, and freedom from porosity, blisters, and stickiness.

The invention will be better understood from consideration of an exemplary embodiment described hereinbelow, reference being made to the accompanying drawings of apparatus embodying the invention wherein:

Fig. 2 is an enlarged vertical section of the extrusion apparatus taken at right angles to the plane of and on the line 2—2 of Fig. 1;

Fig. 3 is an enlarged vertical section of parts shown in Fig. 1;

Fig. 4 is a transverse section taken on the line 4—4 of Fig. 2;

Fig. 5 is a transverse section taken on the line 5—5 of Fig. 2;

Fig. 6 is a transverse section taken on the line 6—6 of Fig. 2;

Fig. 7 is a transverse section taken on the line 7—7 of Fig. 2; and

Fig. 8 is a diagram showing the relationship of several cross-sections along the length of the extrusion die.

Figure 1:
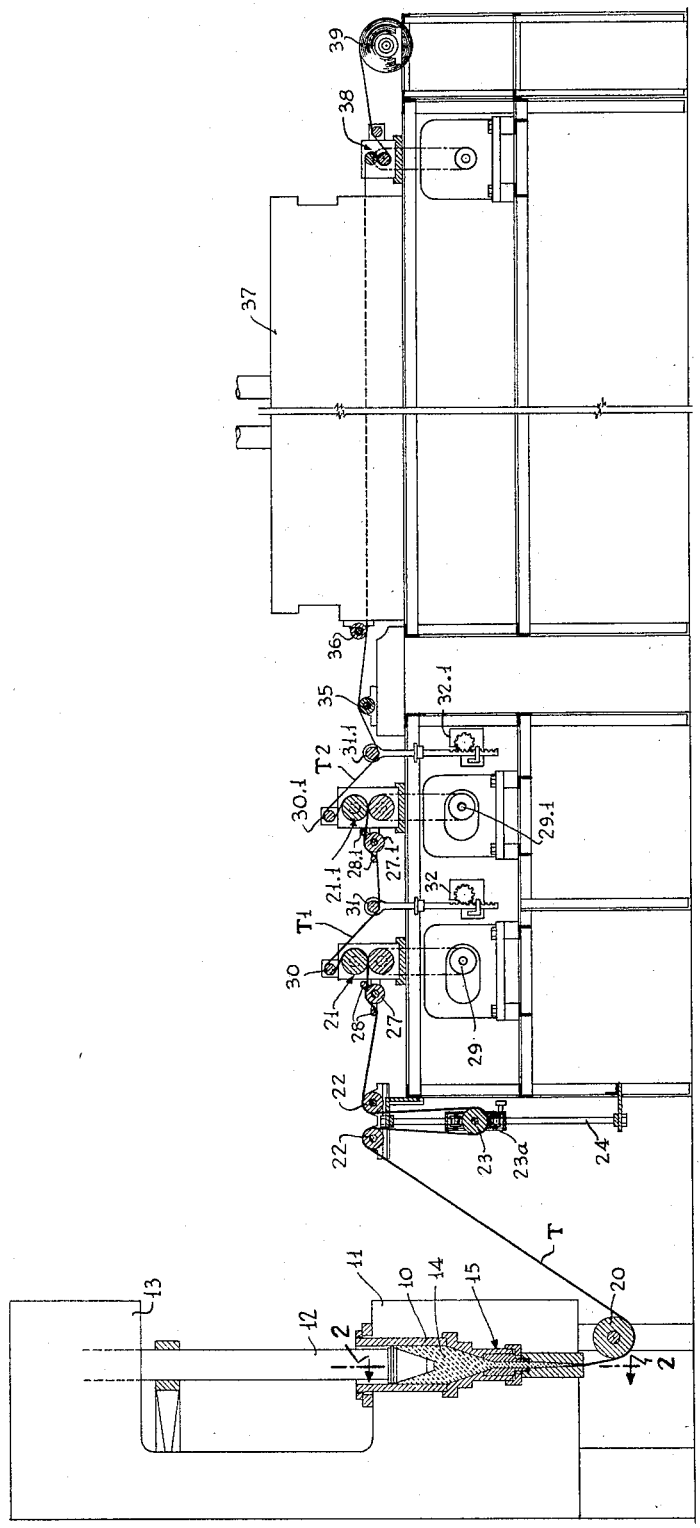
Fig. 1 is a side elevation, partly in section of apparatus for making transversely coherent extruded "Teflon" tape or ribbon according to the present invention.

The nature and characteristics of polymerized tetrafluoroethylene or polytetrafluoroethylene ("Teflon" as it has come to be commonly designated commercially) are well known. The material is described in Patent No. 2,230,654 Plunkett.

The powder contemplated for use herein is a flocculated colloidal dispersion and its production is disclosed in Patent No. 2,478,229 Berry.

The lubricated mixture contemplated for use herein is disclosed in Patent No. 2,510,078 Compton et al. Several lubricants are referred to in that patent and would be suitable for present purposes but the one which has so far been found most suitable for easy evaporation without leaving blisters is a light hydrocarbon oil—a highly refined kerosene, for example.

The proportion of lubricant to plastic powder is important to the present invention. If there is too little lubricant the material does not flow well and the resultant tape is so dense that the layers do not integrate together properly during subsequent sintering. If there is too much lubricant the necessary high pressure of extrusion and intermingling of fibers cannot be obtained and the tape may be so saturated with lubricant on and near the surface that blisters and blemishes will be formed during the evaporation of the lubricant. It has been found that a mixture of about 18 parts by weight of a light mineral oil with about 82 parts by weight of plastic powder gives good results, with permissible variation by four or five points in either direction for reasonably satisfactory results.

The powdered plastic and lubricant are carefully mixed by known methods to obtain complete dispersion without lumping or lubricant segregation; and, if desired, coloring or sizing pigments can be added during mixing.

The mix is preliminarily compressed into compact air-free billets or preforms which are oppositely conical on the ends so as to fit snugly together when placed in the extrusion press. The preform pressure found suitable is about 300 p.s.i. It is not necessary to show the preform press since the billets are shown in Fig. 2 in the extrusion press. It is very important to have the billets tapered to interfit on the ends for this not only shapes them to fit the tapered approach surface of the extrusion die and the tapered ram and to fit each other when several are charged together, as is usual, but also causes the material of one billet to knit with the material of another billet over such a long and tapering overlap that there is never any danger of separation or breakage in the formed tape. When square-ended billets were used it was found to be impossible to prevent strand separation where the material of one billet met that of another.

Referring to the drawings, Fig. 1 shows the complete apparatus for extruding, calendering, drying, and winding an unsintered tape or ribbon. The pre-compressed material is put in the pot or cylinder 10 of an extrusion press 11 having a ram or plunger 12 operated by a power device 13 to force the plastic material 14 through a die 15 to form a tape or ribbon T.

The tape T is drawn off under an idler roll 20 by a set of driven calendering rolls 21, the tape intermediately passing over idler rolls 22 and between them under a tension control roll 23 mounted to move up and down on a slide 23a on vertical guides 24. The slide carrying the roll 23 moves up or down in response to the amount of slack in the tape between the extrusion press and the calendering rolls 21. If the extrusion rate is too slow the slide will move up and through suitable controls will speed up the extrusion rate; and if the extrusion rate is too rapid the slide will move down and reduce the speed of extrusion. It is not necessary here to disclose this control system for an understanding of the invention. It can include limit switches and other means of known kind.

The tape T is fed almost directly into the bight, bite, or nip of the calender rolls 21; that is, it is not first carried partly around one of the calender rolls as is often done in rolling other materials because we have found that "Teflon" tape cannot be rolled smooth if it first passes around one of the reducing rolls. The tape has some back tension in entering the calender rolls and this further aids in avoiding riffles. Further to reduce riffling effects the approaching tape is fed over a guide device 27 having retaining bars 28 which cause it to drag over a given length of the guide surface and bring the tape in at the optimum angle to the bight of the calender rolls. This guide mechanism forms the subject of another application. In that application the guide mechanism is disclosed as having a lateral spreading action on the tape whereby further to insure that riffles are not formed.

The calender rolls 21 are driven by a power shaft 29 and the calendered tape, now designated as T1 because it is thinner and wider, passes partly around one of the rolls for a snubbing action to create more pull, around an idler bar or roll 30 and then beneath a bar or roll 31 of a tension device 32 which controls the speed of the calender rolls 21.

Another set of calender rolls 21.1 with a guide device 27.1 having retaining bars 28.1 and a snubbing bar or roll 30.1 together with a tension bar or roll 31.1 of a tension device 32.1, provide for further calendering and thinning the tape T1 to produce a tape T2. The rolls 21.1 are driven by a power shaft 29.1 whose speed is controlled by the tension device 32.1, as before.

The two sets of calender rolls are representative of a plurality of such rolls, there being as many sets as are desired for the reduction needed. As stated, the rolls used have made increases in length of about 4 or 5 to 1 at each set, giving a total increase in length of about 8 or 10 to 1 in the two sets.

From the last tension roll 31.1 the tape passes along guide rolls 35 and 36 to a heating and evacuating chamber or oven 37 where the excess oil is driven off and removed. The finished unsintered tape is drawn forward by pulling rolls 38 and is wound up on a spool 39. The final tape may be split into desired widths for use or sale.

Figs. 2 and 3 show how separately preformed billets or slugs 14.1 having interfitting truncated conical projections 14a and depressions 14b are charged into the pot 10 to be extruded by the ram 12. The ram has a head 12a which fits a billet depression, the head having an O-ring seal 12b in the pot and an air release tip 12c to release air when the ram is brought down on a charge to avoid forcing air into the plastic material. The air release device is pressed outward by a spring 12d and admits air when the ram starts to withdraw to relieve the vacuum to prevent injury to the charge remnant left in the pot. Channels 12e and 12f through the tip and ram body with side openings 12g and 12h provide for air passage. Nuts 12k retain the tip in the head. This air release device forms the subject matter of another application.

The die 15 includes a conical tapered part 12a, a small long tubular part or land 15b and a fan-shaped tape-forming part 15c. The fan-shaped part includes an enlarged intermediate portion where the material spreads out and intermixes in passing to the eventual thin wide outlet at the end of the die.

The taper of the conical part is such that it causes a mixing and kneading action of the material in entering the small tubular land portion. The angle has been found to be somewhat critical for this action. Best results have been obtained when the angle is about 12° to 30°, with best results at about 17° on each side of the center line, or about 24° to 60° total cone angle. The land is relatively small and relatively long so as to require very high pressure in forcing the material through. As an example, a pot diameter of about 4½ inches and a land diameter of about ½ inch have produced good results, a ratio of diameters of about 9 to 1 and a ratio of cross section areas of about 81 to 1. The land is about two-thirds as long as the tapered part.

The rod-shaped strip emerging from the land 15b has been found to have considerable transverse strength due to the mixing or kneading action in passing through the dies at very high pressure. We have found that it can be calendered to give unsintered tape having fairly high side strength. However, there are practical difficulties in making thin tape from such a thick narrow round strip and it is preferred to extrude the rod into a tape form. This could be done in two stages or machines but preferably and more conveniently is done by a single mechanism, as illustrated.

Here the fan-shaped die 15c is connected to receive material directly from the tubular land portion 15b. The relative shapes and sizes of material during extrusion are shown in Figs. 4, 5, 6 and 7 and the relative areas are shown in Fig. 8. In Fig. 7 and at the bottom of Fig. 8 the very thin wide shape of the final die opening and emerging tape are shown. Just above in Fig. 8 there is shown an increase in area from the straight tubular land 15b followed by a decrease to the end. This, together with the outward spread of material into the fan shape seems to involve another kneading or mixing action to give great transverse strength to the emerging tape. The fan-shaped die part is somewhat longer than the conical approach part 15a. The angle of spread is within the same range, being found best at between 15° to 30°, with best results at about 21°, on each side of the axis or about 30° to 60° total angle of divergence. At right angles the angle is about 2° on each side or 4° total angle of thinning toward the end. The final opening is about 6 inches wide and about .017" or .018 inches thick. With a larger pot and ram the other dimensions will increase correspondingly, those given being examples of actual practice. The reduction in area from the round rod to the tape is about 7 or 9 to 1. The total reduction in area from the pot to the tape is thus about 600 to 1 and the pressure at emergence is very great, being about 300,000 p.s.i. or more. So far as known, this is a much higher pressure than has previously been thought possible without spoiling the material. Excessive pressure, under prior known extrusion conditions, tends to make the material too dense and unable to bond together in wraps, hence useless sintered at once. Sintered tape cannot satisfy the uses for unsintered tape.

The tape from the die is very strong transversely for unsintered material, having a pull strength of 300 p.s.i. or above as against practically zero cross strength for normally extruded strip. Relative longitudinal strength is 2000 to 2800 p.s.i.

By subsequent calendering the strip is lengthened by about 8 or 10 to 1 and widened considerably, the final tape with this order of reduction being about .003 inch thick and about 8 inches wide. The final tape after calendering is very uniform in thickness and strength, the side strength being greatly improved by the calendering operation. The calendering operation also squeezes the oil to the surface so it can be removed easily in the oven. The oven is quite long and the heating is gradual so that blisters are not formed by oil which may remain below the outer surface. The heating temperature is about 300° to 400° F., well below the sintering temperature of 700° and above.

The use of nesting conical-ended billets provides for complete knitting together of material so that there is no line of weakness along the length of the tape. By successive infeed of billets a tape of unlimited length without breakage may be made. Heretofore it has been difficult to make a tape longer than that which could be formed from a single billet.

No heating of the dies is necessary with this method and apparatus.

The tremendous pressure at the end of the fan shaped die tends to spread it in the middle of its width. In the drawings the metal is shown very thick to inhibit spreading but if compensation is wanted a heavy double bar clamp may be placed at the end with one to three cap screws in each bar located along the width of the die for adjustment to keep the opening entirely uniform across the whole width.

It is thus seen that the invention provides improved apparatus and method for making unsintered plastic tape of a material such as "Teflon" which has relatively great transverse strength to make it reliably useful for its intended purposes.

While one embodiment of the invention has been described for purposes of illustration it is to be understood that there may be various embodiments and modifications within the general scope of the invention.

What is claimed is:

1. The method of forming unsintered polytetrafluoroethylene tape with high transverse strength which comprises, placing a compact conical protruded-recessed ended preform of powdered material mixed with a lubricant in an extrusion press having a pot and ram fitting the preform, and forcing the mixture down a tapered die into a small rod shape in a long die land and forcing the rod shape out into a fan shaped die of increasing width and decreasing depth and cross-sectional area between its entry and delivery ends to form a tape at a pressure of about three-hundred thousand pounds per square inch or more just before it emerges at the outlet of the die.

2. The method of forming unsintered polytetrafluoroethylene tape with high transverse strength which comprises, successively placing conical-ended end-interfitting compact preforms of powdered material mixed with a lubricant in an extrusion press cylinder, and forcing the mixture down a tapered die into a small rod shape in a long die land and forcing the rod shape out into a fan-shaped die of increasing width and decreasing depth and cross-sectional area between its entry and delivery ends to form a tape at a pressure of about three-hundred thousand pounds per square inch or more just before it emerges at the outlet of the die.

3. The method of forming dense porosity-free unsintered polytetrafluoroethylene tape with high transverse strength, of uniform cross section and free from surface wrinkles, which comprises, placing a compact conical protruded-recessed-ended preform of powdered material mixed with a lubricant in an extrusion press having a pot and ram to fit the preform, forcing a compacted preform of the powdered plastic material and a lubricant at high pressure down a tapered die and through the restricted long land of a reducing die into a fan-shaped tape die of increasing width and decreasing depth and cross-sectional area between its entry and delivery ends to form a tape at a pressure of about three-hundred thousand pounds per square inch or more just before it emerges at the outlet of the die, thereafter calendering the tape with accentuated side flow to form a thinner tape, and thereafter eliminating the lubricant.

4. The method as set forth in claim 1, wherein the reduction in area from the extrusion press chamber or pot to the land is in the range of eighty to one and the taper is in the general range of 24 to 60 degrees to cause mixing of fibers in the rod which is formed.

5. The method as set forth in claim 1, wherein the reduction in area from the extrusion press chamber or pot to the outlet of the fan-shaped die is in the range of about six hundred to one.

References Cited in the file of this patent

UNITED STATES PATENTS

| | | |
|---|---|---|
| 2,685,707 | Llewellyn et al. | Aug. 10, 1954 |
| 2,740,157 | McCurdy et al. | Apr. 3, 1956 |
| 2,752,321 | Heller | June 26, 1956 |
| 2,770,842 | Hahn et al. | Nov. 20, 1956 |
| 2,774,106 | Bethe | Dec. 18, 1956 |